Feb. 21, 1967　　F. HERBSTHOFER　　3,304,698
THREE-POINT HITCH MOUNTED CROP GATHERING
AND TREATING APPARATUS
Filed Oct. 27, 1964　　　　　　　　　　6 Sheets-Sheet 1
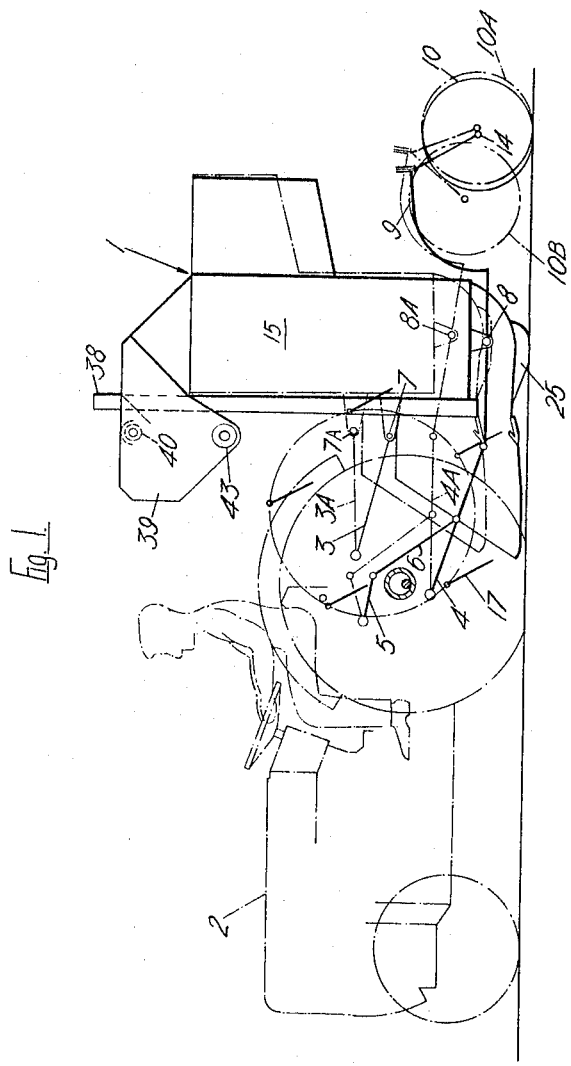
Inventor
FRANZ HERBSTHOFER
By Tweedale & Gerhardt
Attorneys.

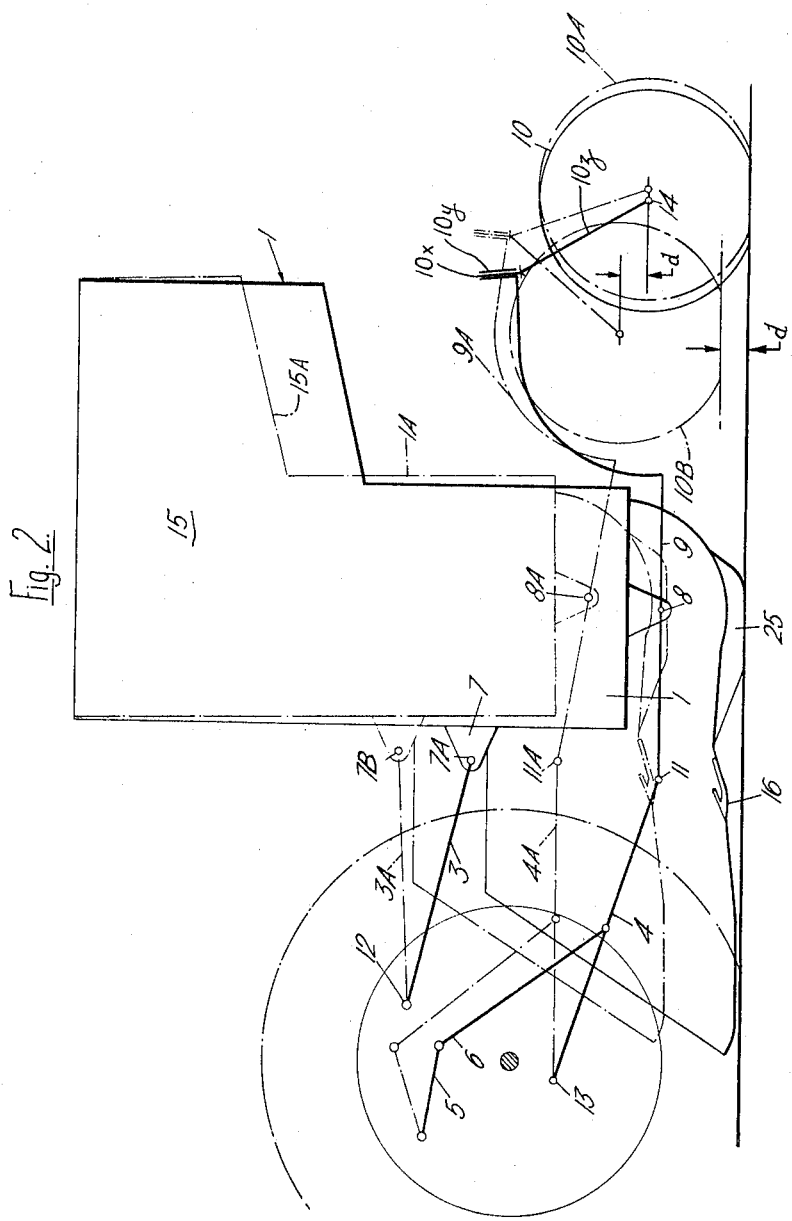

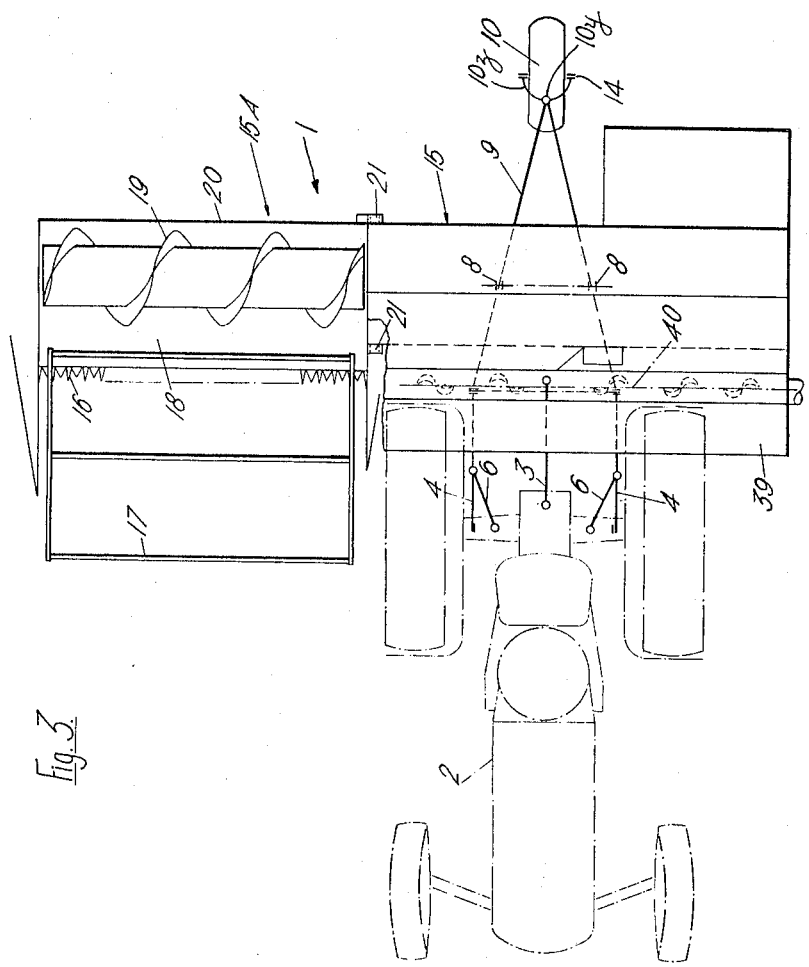

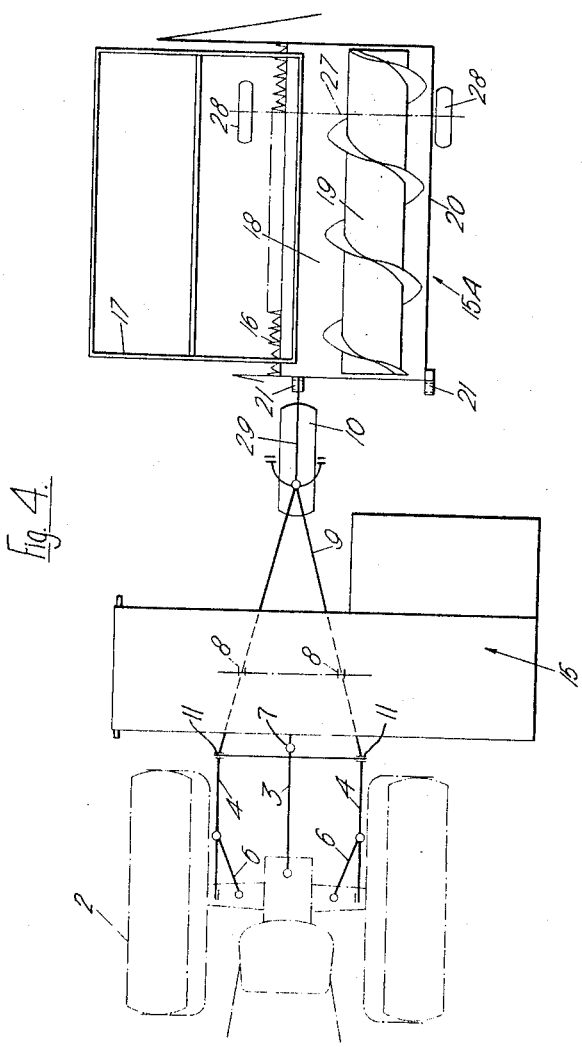

Feb. 21, 1967  F. HERBSTHOFER  3,304,698
THREE-POINT HITCH MOUNTED CROP GATHERING
AND TREATING APPARATUS
Filed Oct. 27, 1964  6 Sheets-Sheet 5
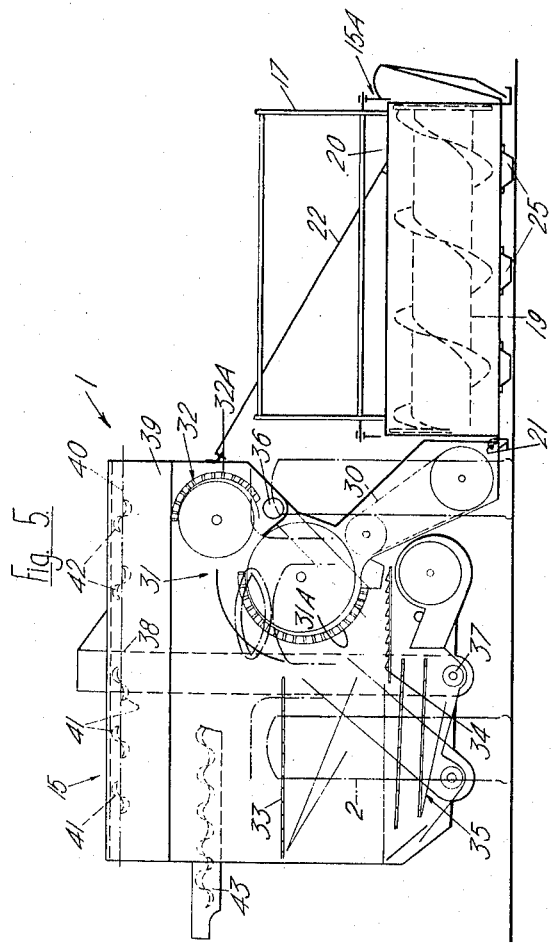
Inventor
FRANZ HERBSTHOFER
By Tweedale & Gerhardt
Attorneys.

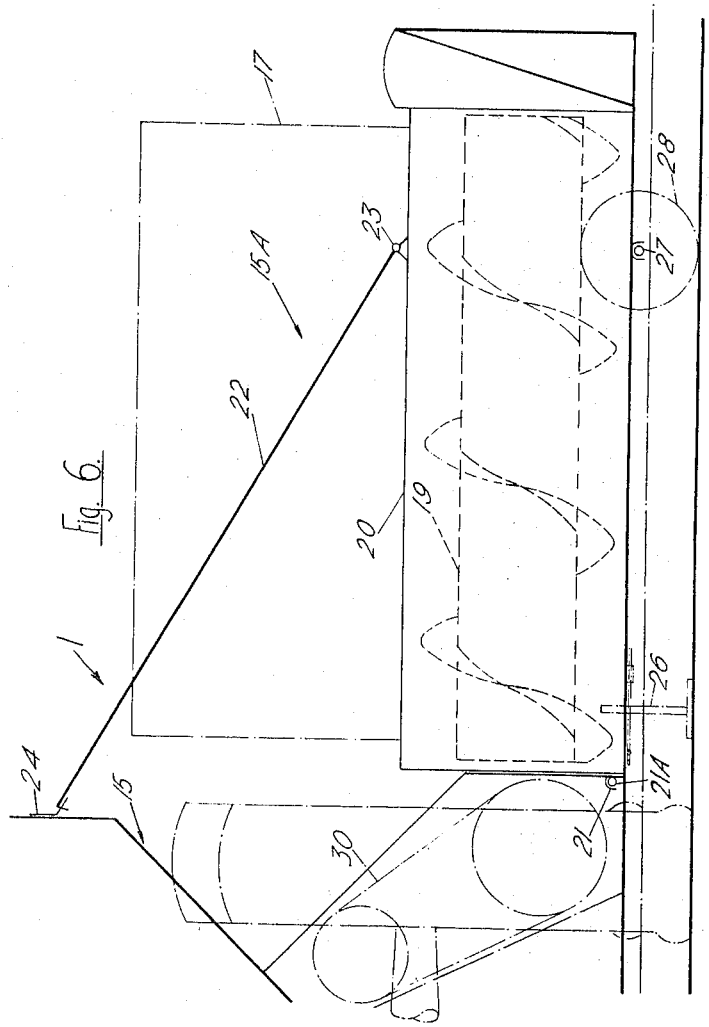

United States Patent Office 3,304,698
Patented Feb. 21, 1967

3,304,698
THREE-POINT HITCH MOUNTED CROP GATHERING AND TREATING APPARATUS
Franz Herbsthofer, Eschwege, Werra, Germany, assignor to Massey-Ferguson G.m.b.H., Kassel, Germany
Filed Oct. 27, 1964, Ser. No. 406,728
Claims priority, application Great Britain, Oct. 30, 1963, 42,748/63
16 Claims. (Cl. 56—20)

This invention relates generally to combine harvesters and other agricultural machines for harvesting or gathering crop material from the ground and simultaneously treating the crop material in the field, and more particularly to such apparatus of the nonself-propelled type that must be towed by or mounted on a tractor.

Self-propelled agricultural combine harvesters are capable of efficiently harvesting large quantities of crops within short periods of time. However, the size, cost and expense of maintaining and storing such machines renders them inefficient for the small scale farmer, or the farmer having small fields to harvest.

There is, therefore, a large demand for smaller, less expensive combines and other crop treating apparatus that can be mounted on, or towed by a tractor. Presently available apparatus of the latter type include those that are mounted on the side of the tractor by special attachment frames which are difficult to maneuver, and to adjust to varying cutting heights for accommodating different types of crops and varying field conditions. Moreover, the weight distribution with respect to the rear wheels of the tractor is such that traction is reduced to a degree that under mildly difficult conditions the wheels of the tractors tend to slip. Further, transporting the apparatus from one field to another is difficult and hazardous due to the width and bulk of the mounted machine.

Other available types of nonself-propelled combines and similar crop treating apparatus include those that are trailed or pulled behind the tractor. Among the disadvantages of presently available pull-type apparatus are that the weight of the towed apparatus is only partially carried by the tractor rear wheels, and the working height of the machine or apparatus must be adjusted independently by the operator, necessitating his stopping and dismounting from the tractor.

However, a more serious defect of both the available pull-type and mounted crop gathering and treating apparatus is that when the working height of the apparatus is adjusted, or when operating on an incline, the apparatus tilts or cants with respect to the ground. This canting or tilting impedes the operation of the crop treating machinery which is designed to operate with the apparatus on a level plane.

It is therefore an object of this invention to provide a combine harvester or other crop gathering and treating apparatus that can be mounted on tractors having a conventional power operated, three-point hitch system wherein the operating height of the harvester can be adjusted by the power lift mechanism of the tractor, and wherein tilting of the harvester is substantially eliminated during raising and lowering thereof, and during operation on inclined surfaces.

A further object is to provide a combine harvester or other crop gathering and treating apparatus for mounting on the three-point hitch system of a tractor in which the greater part of the weight of the combine rests on the rear axle of the tractor.

Still another object is to provide a semi-mounted combine harvester and similar apparatus which can be moved from field to field along roads or highways without impeding normal traffic.

Still another object is to provide a semi-mounted agricultural apparatus for harvesting or gathering crop material from the ground and simultaneously treating the material in the field in which the apparatus can be mounted on the conventional three-point linkage of a tractor and raised and lowered to vary the operating height of the apparatus by the power lift system of the tractor.

Yet another object is to provide a semi-mounted combine harvester or similar apparatus that can be quickly coupled to or uncoupled from a tractor by one man.

The present invention is embodied in a combine harvester having a grain separating unit, the base of which is pivotally supported on a rigid support frame, and the front wall of which is pivotally connected with the upper link of a tractor having a power operated, three-point hitch linkage of the "Ferguson" type. The forward end of the support frame is connected with the lower links of the tractor hitch linkage, and the rear end is supported on a caster wheel. The grain separating unit is mounted well forward of the caster wheel so that the greater proportion of its weight is carried by the tractor rear wheels.

As the lower links are raised and lowered by the tractor power lift system, the support frame acts as a lever about the rotational axis of the caster wheel to raise and lower the harvester, and the upper link maintains the harvester in a substantially vertical or level position, throughout the range of normal vertical movement of the lower link, and on inclined surfaces. The cutting head of the harvester extends laterally from the grain separating unit and may be detached and towed behind the grain separating unit for transport.

Other objects, advantages and features of the invention will become apparent from the following description taken in connection with the accompanying drawings in which:

FIG. 1 is a diagrammatic side view of a tractor and combine harvester embodying the present invention with the harvester shown in its normal, operating position;

FIG. 2 is a view similar to FIG. 1 on a larger scale;

FIG. 3 is a plan view of the tractor and combine of FIG. 1;

FIG. 4 is a plan view of the combine and tractor showing the harvester in the transport position with the cutting head detached and connected to be towed behind the crop treating housing;

FIG. 5 is a rear view corresponding to FIG. 3; and

FIG. 6 is a fragmentary rear detail view to a larger scale of the cutting head of the combine.

With reference to FIGS. 1, 2 and 3, reference numeral 1 designates collectively a crop gathering and treatment apparatus including a crop treatment unit 15 and a crop gathering or harvesting unit 15A which is connected in trailed relationship behind a tractor 2. In the illustrated embodiment, apparatus 1 is a combine harvester having a cutting head 15A and a grain separating unit 15, the operating parts of the harvester being driven by the power-take-off shaft of the tractor (not shown). Tractor 2 includes a "Ferguson" three-point hitch linkage including an upper link 3 and a pair of lower draft links 4. Lower links 4 are connected to power operated lift arms 5 by drop links 6 in a conventional manner.

The grain separating unit 15 of harvester 1 is formed with an apertured lug on its front wall which is pivoted to the outer end of upper link 3 at a pivot point 7, and is formed with an apertured lug on its base which is pivoted to a support frame 9 at a pivot point 8. The rear end of frame 9 is supported on a caster wheel 10 rotatably mounted in a fork 10z extending on an inclined axis from a spindle 10x which in turn is rotatably mounted in a sleeve bearing 10y secured to the rear of frame 9. In the normal, operating position of the harvester, as shown in the full-line position of FIGS. 1 and 2, sleeve bearing 10y is inclined upwardly and forwardly as viewed in FIG. 2.

Frame 9 has its forward end pivotally connected at 11 to the outer end of lower links 4. The upper link 3 and lower links 4 are pivotally anchored at their forward ends to the tractor at pivot points 12 and 13, respectively. The pivotal axes 7, 8, 11, 12 and 13 are parallel to each other and are each transverse to the direction of travel of the tractor. The pivotal axes 7 and 11 are located at a lower level, respectively, than the axes 12 and 13 of links 3 and 4 so that the upper and lower links 3 and 4, respectively, are downwardly and rearwardly inclined and are substantially parallel in the lower-most position shown in full-lines in FIGS. 1 and 2. Further, in the latter position, the pivotal axis 8 is located at a lower level in the full-line position that the rotary axis 14 of caster wheel 10 with respect to fork 10z. The pivotal axis 8 is nearer the front pivotal axis 11 than the wheel axis 14 with the result that the greater proportion of the weight of the combine is carried by the rear wheels of the tractor.

To raise the harvester from the full-line position of FIGS. 1 and 2 to the chain dotted position, the operator actuates the power lift arms 5 to pivot lower links 4 in a counter-clockwise direction about axis 13 as viewed in FIGS. 1 and 2. As a result, the pivotal axes 7, 8 and 11 move to the positions indicated at 7A, 8A and 11A, respectively.

During the raising motion of the lower link 4, support frame 9 pivots on the wheel 10 to act somewhat as a lever, and there is a slight rearward movement of frame 9 and caster wheel 10 to the position shown chain dotted at 9A and 10A, respectively. In the positions indicated by the subscript letter A, the pivotal axes are only slightly rearwardly displaced relative to their initial positions and links 3 and 4 are in a substantially horizontal position. The height adjustment of the harvester 1 from the full-line position to the chain dotted position indicated by the subscript letter A is considerable, as indicated in the drawings, while the tilting or canting of the harvester is so small as to be considered negligible.

Further raising of links 3 and 4 from the positions indicated at 3A and 4A, causes the pivotal axes 7 and 11 to move forwardly with axis 7 moving forwardly to a greater extent than axis 11 due to the relative lengths of links 3 and 4. The latter movement is compensated somewhat by caster wheel 10 swiveling about the axis of spindle 10x to the forward position shown chain dotted at 10B in FIG. 3 and slight forward movement of frame 9. As the wheel 10 swivels, the height of the rear end of frame 9 above the ground is reduced to cause the grain separating unit 15 of harvester 1 to remain substantially level, that is, pivot point 8 moves downwardly and forwardly to compensate for the forward movement of pivot points 7 and 11.

When the axis of spindle 10x is inclined forwardly, i.e., when links 3 and 4 are in the full-line position of FIGS. 1 and 2, the weight of harvester 1 exerts a force on wheel 10 having a horizontal component to the right (toward the right in FIGS. 1 and 2). However, as fork 10z is rotated in a clockwise direction in FIGS. 1 and 2 about the axis 14 of wheel 10 sufficiently to cause spindle 10x to move across the vertical, the direction of the horizontal component reverses and tends to push the wheel toward the left in FIG. 2. This reversal of the horizontal component of force therefore causes the caster wheel 10 to swivel about the axes of spindle 10x and sleeve bearing 10y to the chain dotted position 10B in FIG. 2.

When the wheel moves to the position indicated at 10B in FIG. 2, the rotary axis 14 of wheel 10 moves upwardly with respect to the rear end of frame 9 by a distance designated at d in FIG. 2. Thus, the rear end of frame 9 moves downwardly with respect to the ground by the distance d, resulting in downward and forward rotation of pivot point 8 about pivot point 11 to compensate for the forward movement of pivot points 7 and 11 as they move upwardly past the horizontal.

With reference to FIGS. 3–6, cutting head 15 of harvester 1 includes a cutter bar 16, a reel 17, a platform 18 and a feed auger 19 enclosed within a housing 20.

In its operating position, cutting head 15A projects laterally from the grain separating unit 15 and tractor 2 as shown in FIGS. 3, 5 and 6, and is releasably attached to grain separating unit 15 by downwardly open hooks 21 engaging rods 21a on unit 15 as best shown in FIG. 6. The cutting head 15A is rigidly supported on the grain separating unit 15 by a stay 22 hinged or hooked at one end to housing 20 at 23, and hooked at its other end to an eyelet 24 on the grain separating unit 15.

Housing 20 is provided with skids 25 which rest on the ground when the harvester is in its lowermost operating position. When links 4 are raised or lowered by the power lift arms 15, cutting head 15A rises or falls as a unit with the grain separating unit 15 to vary the cutting height of cutter bar 16.

For transporting the harvester 1 along roads or highways, a ground support member 26 (FIG. 6) is lowered from the inner end portion of housing 20 of cutting head 15A, and an axle 27 having ground wheels 28 is placed below the outer end portion of housing 20. Harvester 1 is then lowered so that cutting head 15A is supported on wheels 28 and support 26, and the grain separating unit 15 separates from hooks 21 upon further lowering of links 4. Stay 22 is then unhooked to completely detach head 15A from grain separating unit 15.

The ground support member 26 is then retracted and unit 15A may be wheeled to the rear of grain separating unit 15 where it is hitched to frame 9 by a tow bar 29 as shown in FIG. 4. Alternatively, tractor 2 may be used to maneuver the unit 15 in front of unit 15A. Mounting of cutting head 15A on the grain separating unit 15 is effected in substantially the reverse order.

In operation of harvester 1, cut crop material is delivered by feed auger 19 to an elevator 30 (FIGS. 5 and 6) which passes the material to a threshing assembly 31. As the material passes through the threshing assembly, straw passes to a rear beater and separating unit 32, and from separating assembly 32, to straw walkers 33 from which the straw is discharged at the side of the grain separating unit 15. The separated grain falls through concave 31A of assembly 31 onto a grain pan 34 from which it passes to a shaker shoe 35. Grain passing through the second concave 32A is collected by an auger 36 which passes it to the grain pan 34.

Clean grain passing through shaker shoe 35 is collected by an auger 37 and delivered to an elevator 38 which discharges the grain into a grain tank 39. Tank 39 has a grain spreading auger 40 having inter-spaced flights 41 and 42 on opposite sides of the discharge point of elevator 38 which are of opposite hand. The grain from grain tank 39 may be discharged by an unloading auger 43 as shown in FIG. 5.

During raising and lowering of the lower links 4, the tilting or canting of the harvester relative to the tractor is so negligible that the grain separating mechanism remains substantially level at all heights to which the harvester is adjusted. Furthermore, the harvester may operate under most difficult harvesting condition since the tractor wheel slip is minimized due to the fact that the greater part of the weight of the harvester is taken by the rear wheels of the tractor. Moreover, the mobility of the tractor is reduced little, if any, by the harvester since it trails the tractor from the three-point linkage. Stress on the tractor power lift is minimized due to the fact that frame support 9 acts as a lever about the rotary axis 14 of wheel 10 during raising and lowering of the harvester.

No modification of the tractor power lift is necessary for mounting the harvester thereon. The harvester can be hitched and unhitched to the tractor, and the cutting head unit can be hitched to the gain separating unit in its operative and road travel positions by a single operator with a minimum amount of effort.

While a combine harvester is illustrated in the drawings and described in the specification, it should be understood that any agricultural apparatus by which crop material is cut or gathered in a field and at least partially treated in the field simultaneously with the harvesting or gathering operation may be secured to the tractor in the manner illustrated. The invention obviously includes any such apparatus which must be raised and lowered relative to the ground by the tractor linkage, but in which tilting must be avoided.

While a single specific embodiment of the invention has been described and illustrated, it should be understood that the invention is not limited to the exact construction shown, but that various alterations and modifications in the construction and arrangement of parts, and various equivalents thereof, are included within the scope and spirit of the invention.

I claim:

1. For use with a tractor having a power lift with upper and lower links, a combine harvester, a support having attachment points pivotally connected to said lower links, a ground wheel on said support spaced rearwardly of said attachment points, means pivotally mounting the harvester on said support intermediate said wheel and attachment points, and a further attachment point on the harvester pivotally connected to said upper link, whereby the harvester may be raised and lowered by the power lift through the intermediary of said support pivoting about the wheel and substantially without canting relative to the tractor.

2. A combine harvester as claimed in claim 1, in which said support extends fore-and-aft in the direction of travel of the harvester, and said wheel is mounted at the rear of the support.

3. A combine harvester as claimed in claim 2, in which said wheel is a caster wheel.

4. A combine harvester as claimed in claim 2, in which the pivotal mounting between the harvester and the support is located nearer to the attachment points for connection to said lower links than to the rotary axis of the wheel.

5. A combine harvester as claimed in claim 2, in which the support extends below the harvester, and said means pivotally mounting the harvester on said support connects the base of the harvester to the frame, and in which said further attachment point for said upper link is at the front of the harvester and upwardly spaced from the base of the latter.

6. A combine harvester as claimed in claim 5, in which the said attachment points are so located on the harvester that said upper and lower links are substantially parallel when connected thereto.

7. A combine harvester as claimed in claim 1, in which the harvester includes a grain treating unit on said support and a cutting head extending laterally from the grain treating unit at one side.

8. A combine harvester as claimed in claim 7 in which the cutting head is formed as a separate unit from the grain treating unit and is rigidly and detachably connected to the latter.

9. A combine harvester as claimed in claim 8 further including downwardly open hooks on the cutting head unit and rods on the grain treating unit engageable by said downwardly open hooks, and a stay pivotally connected at one end to the cutting head unit and at its other end by a hook to an eye on the grain treating unit to connect the cutting head to the grain treating unit.

10. A combine harvester as claimed in claim 9 further including a support on the cutting head adjacent its inner end selectively extendable into contact with the ground so as to support that end of the cutting head unit and thus permit said rods to disengage the hooks automatically upon lowering of the grain separating unit.

11. In combination, a tractor having a power lift with an upper link and lower links, and a combine harvester pivotally connected to said upper link, a support connected at one end to the lower links, and harvester being pivotally mounted on the support, and a ground wheel at the other end of the support about which the support pivots so as to raise or lower the harvester when the said lift is operated, the upper link assisting in limiting canting of the harvester to a negligible amount during said raising or lowering.

12. The combination claimed in claim 11, in which in the lowermost position of the harvester, the upper and lower links of the power lift are downwardly and rearwardly inclined.

13. The combination claimed in claim 12, in which the pivotal connection between the harvester and the support is located at a lower level than the rotary axis of said wheel.

14. In combination with a tractor having upper and lower links pivotally connected to the rear end thereof and power means for raising and lowering said lower links; a support frame having ground support means mounted thereon; means pivotally connecting the forward end of said support frame to said lower links for raising and lowering said forward end about said ground support means upon corresponding movement of said lower links; a crop gathering and treatment apparatus having a base and a front wall; means pivotally connecting the base to said support frame intermediate the ends thereof; and means pivotally connecting the front wall of said apparatus to said upper link whereby said crop gathering and treatment apparatus is maintained in a substantially level attitude during raising and lowering thereof with respect to said tractor.

15. The combination of claim 14 in which said ground support means comprises a caster wheel assembly including a sleeve bearing on the rear end of said support frame projecting upwardly and forwardly therefrom; a spindle mounted in said sleeve bearing for rotation about the axis thereof; a fork extending on an inclined axis from the lower end of said spindle; and a ground engaging wheel rotatably mounted on said fork being operable to swivel about the axis of said spindle and sleeve bearing in accordance with the position of said support frame relative to said tractor as determined by said power means to raise and lower the rear end of said support frame.

16. In combination with a tractor having upper and lower links pivotally connected to its rear end and power means for raising and lowering the lower links; a support frame having forward and rear ends; ground support means pivotally mounted on said support frame near the rear end thereof; means pivotally connecting the forward end of said support frame with said lower links; crop gathering and treating apparatus having a horizontal base and a vertical front wall extending from the forward edge of said base; means pivotally connecting said base to said support frame intermediate the forward and rear ends of said support frame; and means pivotally connecting the front wall of said housing with said upper link.

References Cited by the Examiner
UNITED STATES PATENTS

| 1,930,855 | 10/1933 | MacGregor | 56—20 |
| 2,532,164 | 11/1950 | Hansen et al. | 56—228 X |
| 2,712,358 | 7/1955 | Kuhary et al. | 172—444 X |
| 3,229,451 | 1/1966 | Wenzel et al. | 56—10 |

ABRAHAM G. STONE, *Primary Examiner.*

ANTONIO F. GUIDA, *Examiner.*